J. A. MAGUIRE.
ANTISKIDDING DEVICE.
APPLICATION FILED OCT. 24, 1921.
1,419,680.
Patented June 13, 1922.
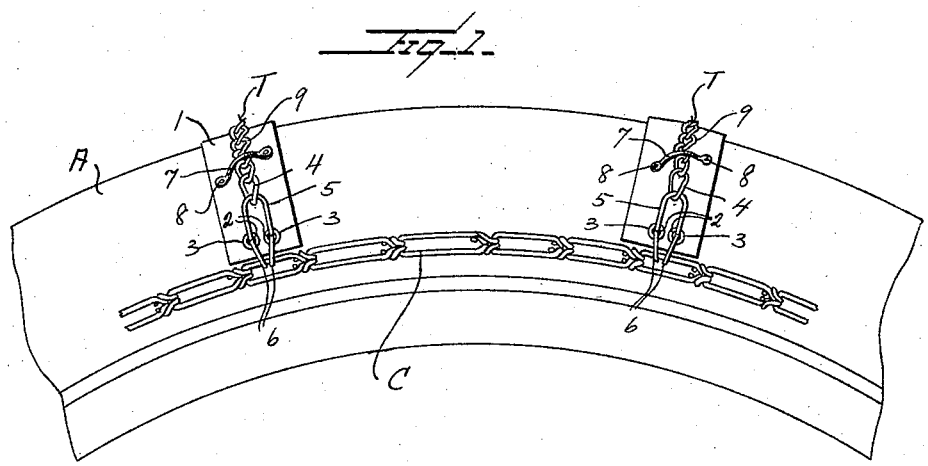
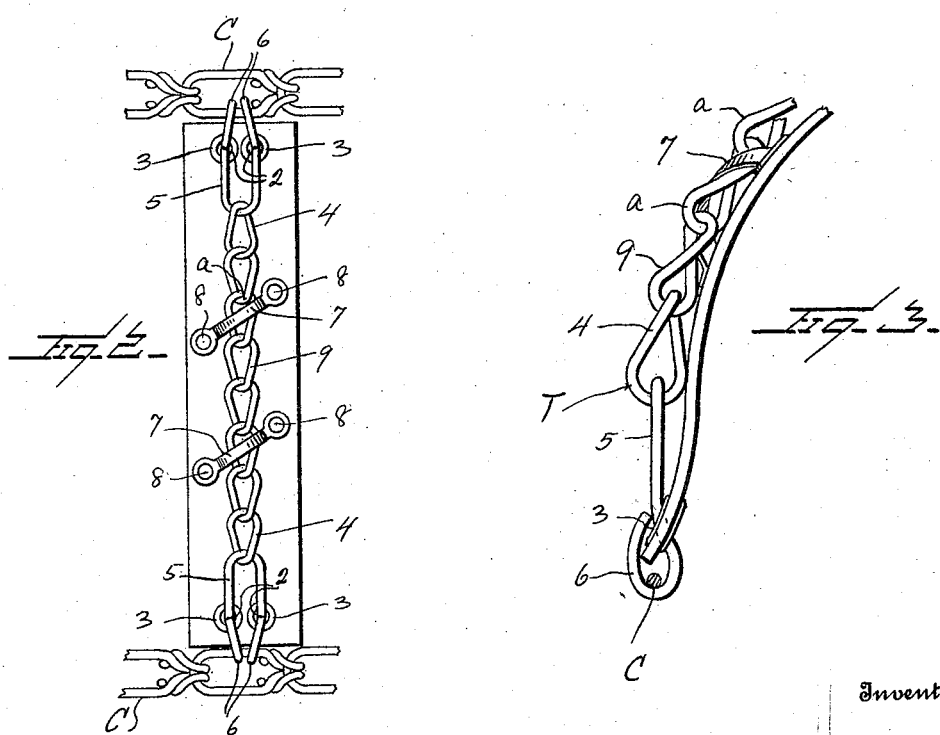
Inventor
J. A. Maguire
By Watson E. Coleman
Attorney

UNITED STATES PATENT OFFICE.

JOSEPH A. MAGUIRE, OF GETTYSBURG, PENNSYLVANIA.

ANTISKIDDING DEVICE.

1,419,680. Specification of Letters Patent. Patented June 13, 1922.

Application filed October 24, 1921. Serial No. 510,063.

*To all whom it may concern:*

Be it known that I, JOSEPH A. MAGUIRE, a citizen of the United States, residing at Gettysburg, in the county of Adams and State of Pennsylvania, have invented certain new and useful Improvements in Antiskidding Devices, of which the following is a specification, reference being had to the accompanying drawings.

This invention relates to certain improvements in anti-skidding devices and has relation more particularly to a device of this general character embodying side chains and cross or connecting tread chains, and it is an object of the invention to provide a device of this general character having novel and improved means wherein the cross or tread chains are prevented from injuring the tire casing or carcass to which the device may be applied.

The invention consists in the details of construction and in the combination and arrangement of the several parts of my improved anti-skidding device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in elevation of a wheel showing an anti-skidding device applied thereto constructed in accordance with an embodiment of my invention;

Figure 2 is a fragmentary view in top plan of my device as herein disclosed; and Figure 3 is a fragmentary view partly in front elevation and partly in section of my device as comprised herein.

As disclosed in the accompanying drawings, C denotes the side chains of a type generally employed in connection with antiskidding devices of this general character and which side chains are connected at desired intervals by the cross or tread chains T. The device in its entirety is adapted to be arranged upon a tire casing or carcass A in a conventional manner.

In order to prevent the cross or tread chains, when the device is applied, from unduly wearing or otherwise injuring the casing or carcass A, each of said cross or tread chains T has associated therewith a flexible strip 1 of heavy rawhide or other suitable material, said strip 1, when the device is applied, being positioned between the adjacent cross or tread chain T and the carcass or casing A.

The strip 1 is relatively wide and of a length to substantially bridge the space between the side chains C. Each end portion of the strip 1 is provided with a pair of transversely spaced openings 2 reinforced by the metallic eyelets or grommets 3. Interlocked with the end links 4 of each of the chains T are the loops 5. The side members of each of the loops 5 is threaded through an adjacent pair of openings 2 and extend beyond the adjacent end of the strip 1. The extended end portions of the loop are returned to form the hook members 6 whereby the cross or tread chain T is properly secured to a side chain C.

It has been established in practice that the efficiency of the device is materially increased by providing means whereby each of the chains T intermediate its ends is secured or anchored to the associated strip 1. As herein disclosed, each of the strips 1 at its central portion is provided with a pair of rigid span members 7 having their extremities riveted at 8 or otherwise secured to the strip 1. These span members 7 bridge the central portion of a chain T and hold said chain in close contact with the strip 1 and in a manner whereby it is assured that said chain T at all times will overlie said strip 1.

The chain T is of a conventional type wherein the links 9 are of the twisted formation and in order that the span members 7 may properly coact with the chain T, said members 7 are disposed across the strip T in a diagonal direction with respect to the longitudinal axis of the strip whereby the intermediate or raised portions of the span members 7 are below the high or gripping portions *a* of the links 9.

With the use of a strip 1 in connection with the chains T, the carcass or casing A to which the device is applied provides a firm foundation for the strip and instead of the chain T contacting with and wearing on the carcass of casing A, such wear is direct on the strip 1.

The span members 7 should be made of very hard metal and preferably of the same quality as the links 9 of the cross chain T so that the same will effectively withstand the strain and wear imposed thereon when the device is in use.

From the foregoing description it is thought to be obvious that an anti-skidding device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with an anti-skidding device including tread chains, a protecting strip underlying each of the tread chains, means for securing the opposite end portions of each of said strips to a tread chain, and a span member secured to the strip and bridging the tread member to hold the intermediate portion of the tread member to the strip.

2. In combination with an anti-skidding device including tread chains, a protecting strip underlying each of the tread chains, means for securing the opposite end portions of each of said strips to a tread chain, and a span member secured to the strip and bridging the tread member to hold the intermediate portion of the tread member to the strip, said tread member having high points disposed outwardly of the span member.

3. In combination with an anti-skidding device including side chains and a tread member connecting said side chains, a protecting strip underlying the tread member, the opposite end portions of said strip being provided with openings, loops secured to the opposite end portions of the tread member and threaded through the openings in the end portions of the strip and extending beyond the adjacent ends of the strip, the extended end portions of the loops being secured to the side members, and means independent of the loops and interposed therebetween for holding the intermediate portion of the tread member to the strip.

4. In combination with an anti-skidding device including side chains and a tread member connecting said side chains, a protecting strip underlying the tread member, the opposite end portions of said strip being provided with openings, loops secured to the opposite end portions of the tread member and threaded through the openings in the end portions of the strip and extending beyond the adjacent ends of the strip, the extended end portions of the loops being secured to the side members, and a span member secured to the strip and bridging the tread member to hold the intermediate portion of the tread member to the strip, said tread member being diagonally disposed with respect to the longitudinal axis of the strip.

5. In combination with an anti-skidding device including side chains and a tread member connecting said side chains, a protecting strip underlying the tread member, the opposite end portions of said strip being provided with openings, loops secured to the opposite end portions of the tread member and threaded through the openings in the end portions of the strip and extending beyond the adjacent ends of the strip, the extended end portions of the loops being secured to the side members, and a span member secured to the strip and bridging the tread member to hold the intermediate portion of the tread member to the strip, said tread member having high points disposed outwardly of the span member.

In testimony whereof I hereunto affix my signature.

JOSEPH A. MAGUIRE.